July 22, 1941.  W. J. A. McKAY ET AL  2,250,068
CHUCK
Filed May 15, 1940

INVENTORS
WILLIAM J. A. McKAY
ARTHUR J. KOON
BY Thomas G. Boman
ATTORNEY

Patented July 22, 1941

2,250,068

UNITED STATES PATENT OFFICE 2,250,068

CHUCK

William J. A. McKay and Arthur J. Koon, Grand Rapids, Mich.

Application May 15, 1940, Serial No. 335,358

9 Claims. (Cl. 279—116)

Our invention relates generally to a holding or gripping device or mechanism and more particularly to a chuck construction wherein one or more jaws move relatively to the work.

It is to be understood that the great majority of chucks, used on the various machines of the machine shops, have exposed threads whereby chips and the like from the metal which is being worked upon, gather therein with the result that the threads and their seats are worn out of correct and exact alinement and also whereby ease of operation or adjustment is more or less destroyed. In other words, the chips and cuttings foul the threads.

One of the main purposes of our invention is to provide means whereby the adjusting means, as a scroll plate, has its threads completely shielded from the chips and thus the unfavorable results, as recited above, are prevented. That is, by our improved device, chips are kept out of the adjusting mechanism and thus it not only operates free and easy for long periods of time but it also maintains an exact alinement of parts whereby the work, exterior, or interior, may be accurately gripped and consequently accurately machined. The chuck thusly becomes chip proof due to the construction employed.

Another feature of our invention lies in the novel oiling system, this giving proper oiling and sufficient oiling at all times.

Furthermore, advantages lie in the inherent construction of our device, not only in its simplicity, this resulting in ease and economy of manufacture, but mostly in its efficiency whereby its shielding function is maintained.

Other objects, advantages and meritorious qualities reside in the special construction, combination and arrangement of the various elements forming our invention, as more fully hereinafter described and claimed, reference being had to the accompanying drawing forming part hereof, wherein:

Like numerals refer to like parts throughout the several figures.

Figure 2:
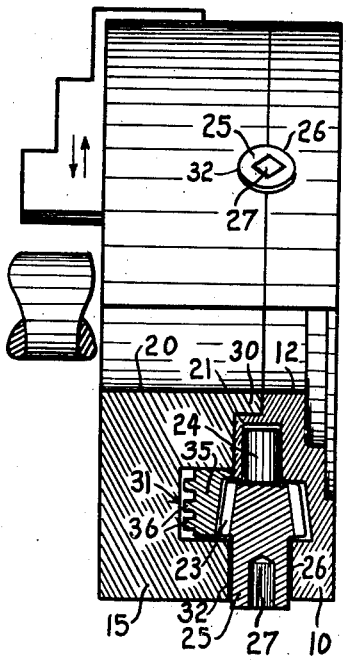
Fig. 2 is a combined side and sectional view taken along the plane of line 2—2 of Fig. 1.
Figure 5:
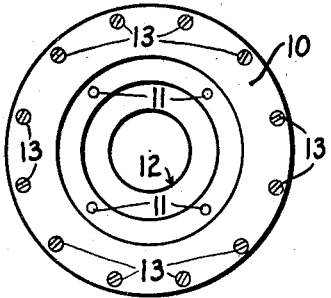
Fig. 5 is a rear view of the chuck shown in Fig. 1, this view being somewhat reduced in scale.

Referring particularly to Figs. 2 and 5, numeral 10 indicates the rear member of the body of the chuck. This member is of annular shape, having threaded holes 11, see Fig. 5, for attaching the chuck onto a supporting body. For instance, it may be bolted onto a revolving element. The member 10 has a central aperture 12 through which the work may be extended when necessary. Bolts 13 extend through the member 10 into the adjacent body member 15 and maintain these members 10 and 15 in rigid relationship.

Figure 1:
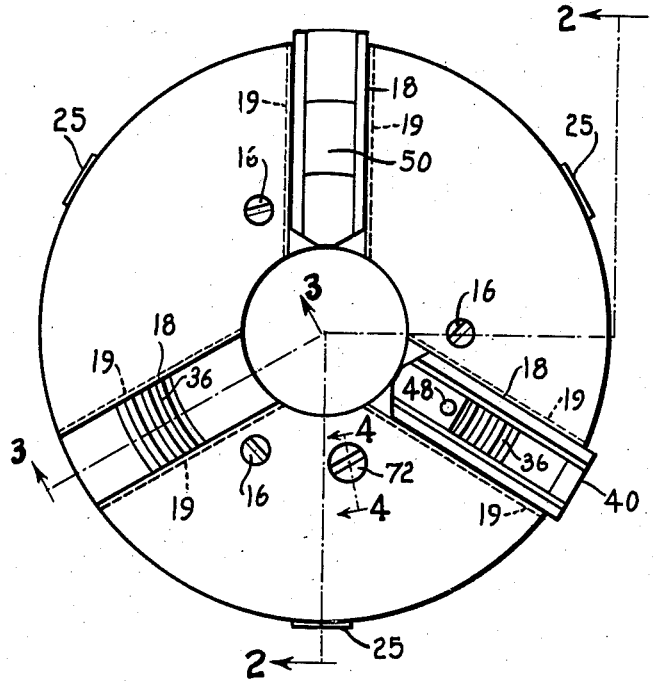
Fig. 1 is a face or front view of a chuck equipped with our invention.

Also, as shown in Fig. 1, additional studs or bolts 16 pass through the front member 15 into the rear member 10 to aid in rigidly securing the members in associated relationship.

Figure 3:
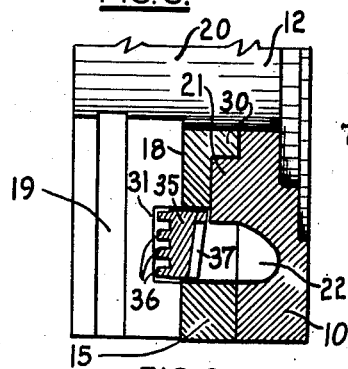
Fig. 3 is a sectional view taken along the plane of line 3—3 of Fig. 1.

As shown at the lower left-hand part of Fig. 1, member 15 is cored or cut away to form a way 18 with a groove 19 formed along each of its side walls. Fig. 1 also shows two other ways 18 with similar grooves 19. The way 18 at the top of Fig. 1 shows both a shoe and a jaw in the way. The way at the right-hand lower part of Fig. 1 shows only the shoe in place. Consequently, reference has been made to the remaining way inasmuch as the showing relative to the body member itself is clearer and more lucid. The grooves 19 extend the complete length of the way 18 as shown in Fig. 3. The body member 15 has an opening 20 formed in continuity with opening 12 for the same purpose.

As shown in Fig. 3 the member 10 has an annular extension 21 and this extension has an annular cored recess 22 located outwardly therefrom. As shown in the lower half of Fig. 2, the extension 21 may be radially drilled inwardly to form a bearing for the end of a pinion shaft to be later described. The recess 22 is machined out to form a flat concentric thrust surface for the small end of the bevel pinion 23 rigid with the shaft 24. Also, the recess 22 is sufficiently cut away to provide clearance for the pinion 23.

The shaft 24 has a larger shaft 25 in alinement therewith at the outer side of the pinion, the member 10 being formed with a half cylindrical journal 26 to partially receive the shaft 25. The shaft 25 has a square hole 27 to non-rotatably receive the tool or wrench for turning the bevel pinion 23. In the present disclosure, three sets of adjusting pinions are shown although it is to be understood that any suitable number may be employed.

As shown in the bottom half of Fig. 2, the body member 15 has the annular ring 30 fitting snugly inside of the annular extension 21 previously referred to. Next, the member 15 has a flat concentric surface which abuts the radial flat surface of the annular rib or extension on member 10. Then the member 15 has an annular groove 31, this groove cutting through each of the three ways 18 as shown in Fig. 3. The member 15 has an annular rib beyond the groove and half cylindrical seats 32, see Fig. 2, are formed therein. These seats cooperate with seats 26, previously mentioned, to revolubly receive shafts 25.

The scroll plate 35 has the spiral thread 36 and bevel teeth 37 oppositely disposed. The spiral thread 36 may ride against the bottom of the groove 31. The bevel teeth 37 mesh with the teeth of the bevel pinion 23. The inner ends of the many teeth on the scroll plate 35 may contact the member 10, see Fig. 3, to prevent binding between the two sets of teeth.

Referring to Figs. 6 to 9, inclusive, 40 indicates the shoe, ribs 41 being formed along the inside and outside of each of the walls 42. These ribs 41 are of such cross section as to slidably engage the grooves 19. Thus each of the shoes, there being a shoe in each of the three ways shown, is free to slide radially of the chuck.

Figure 10:
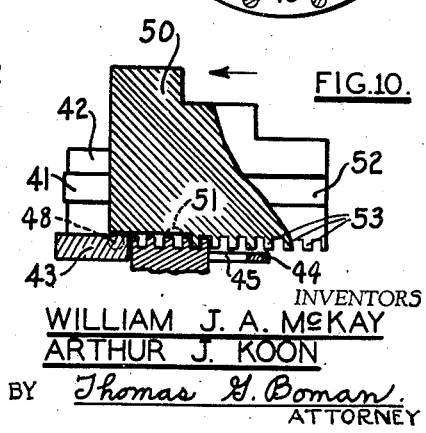
Fig. 10 is a sectional view taken along the line 10—10 of Fig. 6, the sliding jaw also being shown in substantially its outermost position.

Each shoe, see Fig. 10, has a thickened bottom portion 43, this thicker portion being slid first into the way so as to lie towards the center of the chuck. Each shoe also has a thinner portion 44, see Figs. 7, 9 and 10, with an opening 45 between the bottom portions 43 and 44.

Figure 6:
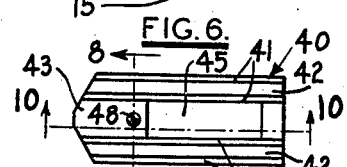
Fig. 6 is a top view of one of the sliding shoes.
Figure 7:
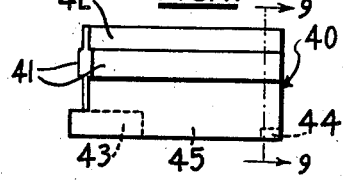
Fig. 7 is a side view of the shoe shown in Fig. 6.
Figures 8, 9:
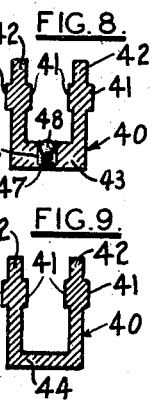
Fig. 8 is a sectional view taken along the plane of the line 8—8 of Fig. 6.
Fig. 9 is a sectional view taken along the line 9—9 of Fig. 7.

As shown in Figs. 1, 6 and 8, a hole 46 is bored into the thicker bottom portion 43, a suitable coiled spring 47 entered, a ball 48 placed upon the spring and then the edge of the hole is peened over the normal edge of the hole 46 to thus prevent removal of the ball. This construction gives a spring pressed ball which serves as a friction connection between the shoe and the jaw 50. The jaw 50, see Fig. 10, has a recessed seat 51, to receive the projecting part of the spring pressed ball whenever the jaw is located with its inner edge even with the central opening through the chuck or inwardly therefrom.

The jaw 50 has a groove 52 along each side thereof, see Fig. 10. These grooves receive the ribs 41 which are located upon the outer sides of the side walls of the shoe 40. Thus the jaw may reciprocate along its shoe. The bottom of each jaw has teeth 53 which mesh with the spiral tooth on the upper side of the scroll plate and thus rotation of the scroll plate causes inner and outer movement of the several jaws.

Figure 4:
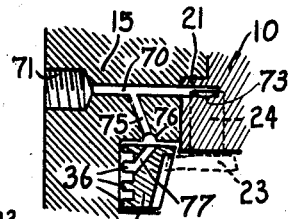
Fig. 4 is a fragmentary sectional view taken along the plane of line 4—4 of Fig. 1.

The body members 10 and 15, after assembly, may have an oil hole 70 drilled therein, see Fig. 4, threaded at 71 to receive the plug 72, see Fig. 1. This oil hole 70 intercepts the bearing hole for the small shaft 24 to provide a passageway 73 therebetween. Thus the bevel gear assembly is lubricated.

The body member 15 also has a second duct 75, see Fig. 4, leading from the first duct into the annular recess 31. An annular groove 76 joins with the duct 75 and provides for circumferential distribution of the lubricant. The scroll plate may have one or more ducts 77 as shown.

The operation is readily understood. After the several parts have been assembled, entry of the tool into any of the square holes 27, permits rotation of the pinion in the chosen direction whereupon the several jaws move inwardly or outwardly.

For example, referring to Fig. 10, the jaw may be moved inwardly. Prior to this movement the shoe is located as shown and thus the threads or intermeshing parts between the jaw and the scroll plate are shielded from chips, dirt or the like from the work or any other source. Any suitable number of jaws may be utilized. And their gripping surfaces may be hard or soft or a combination unit as required.

As the jaw is moved inwardly the shoe remains in its shielding or protecting position. When the edge of the jaw is even with the edge of the shoe, the spring pressed ball snaps into the recess 51 and thus further movement of the jaw is accompanied by movement of the shoe. Thus the thickened bottom portion of the shoe will move out of the way of the teeth 53 on the bottom of the jaw. The opening 45 through the bottom of the shoe permits this inward movement.

Upon outward movement the shoe will move along with the jaw, due to the spring pressed ball connection, until the inner edge of the jaw and also the inner edge of the shoe become even with the work opening 20 and 12, whereupon the construction is such as to cause the thick bottom portion 43 to contact the scroll plate. This stops further movement of the shoe and it remains in the position as shown in Fig. 10. Further movement of the jaw presses the ball 48 inwardly against the action of the spring 47 and thus separate movement of the jaw is permitted. The length of the thicker bottom portion 43 prevents separation therebetween and the jaw member and thus shielding action is continued for the working parts.

Having thus revealed our invention, we claim as new and desire to secure the following combinations and elements, or equivalents thereof, by Letters Patent of the United States.

We claim:

1. In a mechanism of the class described, a first body member, a second body member, means for fastening the said members together, means for supporting the same, said members being cut away to form an annular seat therein, a scroll element revolubly mounted in said seat, means for revolving the said scroll element as desired, a way cut in one of said members in juxtaposition to the teeth of the scroll element, a shoe slidably mounted in said way, a jaw slidably mounted in said shoe, interengaging means between the said teeth and the jaw and a lost motion connection between the jaw and the shoe.

2. In combination with a chuck or the like having a revoluble scroll plate and a way adjacent thereto, a shoe slidable in said way, a jaw slidable in said shoe, interengaging means between the scroll plate and the jaw whereby rotation of the former causes reciprocation of the latter, said shoe and said scroll plate having a lost motion connection therebetween, and friction means between the jaw and the shoe for the purpose described.

3. In combination, a chuck having a way therein, a jaw slidable in said way, shielding means slidably mounted between one end of the jaw and the bottom of the way, means for preventing movement of the said shielding means in one direction and friction means between the shielding means and the jaw for the purpose described.

4. A combination of elements as set forth in claim 3 in which the friction means comprises a depression in one of the members and a spring pressed ball in the other member juxtaposed to the said depression.

5. In a chuck having a way with longitudinal grooves therein, a shoe of U-shape cross section, ribs on the shoe fitting the said grooves whereby sliding movement of the shoe is had, a jaw slidable in the shoe, teeth on the bottom of the jaw, said shoe having an opening through its medial bottom portion, operating means extending upwardly through said opening and engaging the said jaw teeth whereby reciprocating movement of the jaw is obtained, said opening being of larger dimension than the said operating means whereby the shoe may move with the jaw, friction means between the jaw and the shoe, and stop means for limiting the movement of the shoe in one direction.

6. A combination of elements as recited in claim 5 in which the bottom portion of the shoe at one side of the opening therethrough is thickened so that its surface is at least even with the uppermost surface of the operating means whereby the underside of the jaw may snugly engage the upper surface of the said thickened portion.

7. In a chuck having a central opening therethrough, a way extending from said central opening, operating means extending upwardly into the way a distance from the said central opening, movable shielding means extending between the operating means and the said central opening, said shielding means being normally movable with respect to the hereinafter mentioned jaw, a jaw slidable in said way, said jaw being movable to a position over the said central opening, means acting between the jaw and the shielding means whenever the jaw is moved to a position over the said central opening to move the shielding means inwardly over the said central opening, and means for limiting the movement of the shielding means in the other direction to a position wherein the shielding means extends coextensively between the operating means and the edge of the said central opening.

8. A chuck having a way, a shoe therein, a jaw slidable in said shoe, said jaw having depending teeth at one end, the shoe having a thin portion underneath the teeth and a thicker portion adjacent thereto, said thin portion being cutaway to permit operating teeth to extend upwardly therethrough to mesh with the said depending teeth, the thicker portion being above the top of the operating teeth, and interengaging means between the jaw and the shoe for moving the shoe to and fro from an intermediate point in the path of movement of the said jaw.

9. In combination, a chuck having a way therein, a jaw slidable in said way, shielding means, means for mounting the said shielding means for movement relative to both the jaw and the way, and means for detachably connecting the said shielding means and the jaw together to move as one for a portion of their travel for the purpose described.

ARTHUR J. KOON.
WILLIAM J. A. McKAY.